(12) United States Patent
Marshall, III (10) Patent No.: US 11,357,209 B2
(45) Date of Patent: Jun. 14, 2022

(54) PET BED PLATFORM WITH AIR FILTRATION SYSTEM

(71) Applicant: Henry Bennie Marshall, III, Pawleys Island, SC (US)

(72) Inventor: Henry Bennie Marshall, III, Pawleys Island, SC (US)

(*) Notice: Subject to any disclaimer, the term of this patent is extended or adjusted under 35 U.S.C. 154(b) by 182 days.

(21) Appl. No.: 16/264,948

(22) Filed: Feb. 1, 2019

(65) Prior Publication Data

US 2020/0245589 A1 Aug. 6, 2020

(51) Int. Cl.
*A01K 1/035* (2006.01)
*B01D 46/00* (2022.01)
*B01D 46/12* (2022.01)

(52) U.S. Cl.
CPC .......... *A01K 1/035* (2013.01); *B01D 46/0038* (2013.01); *B01D 46/0045* (2013.01); *B01D 46/12* (2013.01)

(58) Field of Classification Search
CPC ...... A01K 1/035; A01K 1/0353; A01K 1/033; A01K 1/015; A01K 1/0047; A01K 1/0052; A01K 31/20; A01K 1/0064; A01K 1/0158; B01D 46/0038; B01D 46/0045; B01D 46/12; A47C 21/044; A47C 21/042; A47C 21/04; A47C 7/744; A47C 7/742; A61G 7/05784
USPC ............ 119/165, 28.5, 420, 500, 418; 5/423
See application file for complete search history.

(56) References Cited

U.S. PATENT DOCUMENTS

| 3,101,488 | A | * | 8/1963 | Peebles ............................. 5/347 |
| 5,264,015 | A | | 11/1993 | Matsui |
| 5,477,810 | A | | 12/1995 | Wilkison, III et al. |
| 5,662,069 | A | * | 9/1997 | Smith .................. A01K 13/001 119/665 |
| 6,237,531 | B1 | * | 5/2001 | Peeples ........................ 119/28.5 |
| 6,261,332 | B1 | * | 7/2001 | Richard ............. B01D 46/0023 55/385.1 |
| 6,553,935 | B1 | | 4/2003 | Penner |
| 6,698,384 | B2 | | 3/2004 | Markowitz |
| 7,011,046 | B1 | | 3/2006 | Kidwell |
| 7,240,386 | B1 | * | 7/2007 | McKay ................ A47C 21/044 5/423 |
| 7,815,604 | B2 | * | 10/2010 | Massengale .......... A61M 5/152 604/132 |

(Continued)

FOREIGN PATENT DOCUMENTS

EP 2260698 A2 12/2010

*Primary Examiner* — Peter M Poon
*Assistant Examiner* — Jeffrey R Larsen
(74) *Attorney, Agent, or Firm* — Kim and Lahey Law Firm, LLC; Seann P. Lahey (57) ABSTRACT

A base platform with a plurality of platform legs mounted to said base platform for raising said base platform. A bedding tray is carried by said base platform with a plurality of tray legs mounted to said bedding tray raising said bedding tray above said base platform to define an air channel between said base platform and said bedding tray. A blower unit is carried by said base platform with an air duct disposed on a perimeter of said base platform receiving air from said blower unit. An air suction gap is disposed between said air duct and said bedding tray with at least one air discharge port disposed in said air duct directing air into said air channel underneath said bedding tray and drawing air downward through said air suction gap around said bedding tray.

18 Claims, 9 Drawing Sheets

(56) References Cited

U.S. PATENT DOCUMENTS

| | | |
|---|---|---|
| 9,451,758 B2 | 9/2016 | Kaneda et al. |
| 9,756,952 B2 * | 9/2017 | Alletto, Jr. ......... A61G 7/05784 |
| 10,426,139 B1 | 10/2019 | Hill |
| 2010/0319626 A1 * | 12/2010 | Williams ............... A01K 1/033 |
| | | 119/500 |
| 2014/0349564 A1 | 11/2014 | Lamothe |
| 2016/0061481 A1 * | 3/2016 | Wolfe .................. A01K 1/0353 |
| | | 236/51 |

* cited by examiner

PET BED PLATFORM WITH AIR FILTRATION SYSTEM

BACKGROUND OF THE INVENTION

1) Field of the Invention

The present invention relates to animal bedding, and more particularly, to a pet bed platform having an air filtration and control system to contain debris by maintaining a negative air pressure around a bed tray to draw air from around the animal and the bed tray into an air filtration system to resist pet hair, dander and other debris from exiting the pet bed platform or escaping the area in which the system is operating.

2) Description of Related Art

Pet hair and dander can be a constant nuisance for pet owners. Even when the animal is confined, the hair and dander is easily spread through a house by airflow within the house.

Open pet bedding surfaces, as well as, enclosed animal housings known in the prior art fail to address the needs of pet owners, particularly dog owners, to control pet hair and dander. Most animal housing or bedding surfaces available for pet owners that involve the use of fans to move air are focused on cooling the pet by blowing air into the housing or pet bed. This creates a positive air pressure situation that causes pet hair, dander and other debris to be tossed into the air and easily spread throughout the home.

Some housings, particularly for cats, include air filtration systems that simple draw air into a closed box type housing, typically when the animal is not present to avoid scaring the animal with fan noise. These systems fail to contain the hair and dander while the animal is spending time in the housing where it can best be contained.

Open air bedding such as cushions, mats, blankets and the like do nothing to control the flow of air around the pet or otherwise actively work to control pet hair, dander and debris. Further, fresh air is not actively being drawn around the animal to cool the animal, while also operating to contain pet hair and dander. Additionally, debris that is too large to be drawn into an air filter, such as small rocks, sand and dirt on dog paws, can collect on the bedding surface where it is ultimately tracked back into the home.

Accordingly, it is an object of the present invention to provide a pet bed platform with an air filtration and control system that maintains a constant negative air pressure around the bed tray to control pet hair and dander from exiting the pet bed platform.

It is a further object of the present invention to provide a pet bed platform with an air filtration and control system that can operate at low noise levels to avoid scaring the animal while on the bed tray.

It is a further object of the present invention to provide a pet bed platform able to capture and separate debris from the animal that is too large to be drawn into the air filtration system.

It is a further object of the present invention to provide a pet bed platform with an air filtration and control system that allows airflow from the sides, top and bottom of the bed tray to help cool the animal while drawing and channeling hair, debris and dander into the air filter.

SUMMARY OF THE INVENTION

The above objectives are accomplished according to the present invention by providing a pet bed platform comprising a base platform; a plurality of platform legs mounted to said base platform for raising said base platform; a bedding tray carried by said base platform; a plurality of tray legs mounted to said bedding tray raising said bedding tray above said base platform to define an air channel between said base platform and said bedding tray; a blower unit carried by said base platform; an air duct disposed on a perimeter of said base platform receiving air from said blower unit; an air suction gap disposed between said air duct and said bedding tray; and, at least one air discharge port disposed in said air duct directing air into said air channel underneath said bedding tray and drawing air downward through said air suction gap around said bedding tray.

In a further advantageous embodiment, said blower unit is mounted to a bottom side of said base platform drawing air downward through an air circulation port in said base platform.

In a further advantageous embodiment, an air filter is disposed in said air circulation port of said base platform filtering air drawn into said blower unit.

In a further advantageous embodiment, a distribution plenum receives air from said blower unit and channels the air into said air duct.

In a further advantageous embodiment, said distribution plenum is carried on a bottom side of said base platform and includes an exhaust port opening directly into said air duct for channeling air from said distribution plenum into said air duct.

In a further advantageous embodiment, a vent is included for releasing air from said distribution plenum into a surrounding area. In a further advantageous embodiment, a vent cover is operatively associated with said vent to selectively control the amount of airflow through said vent to adjust the air pressure within said distribution plenum.

In a further advantageous embodiment, said base platform includes a plurality of leg slots for receiving said tray legs from said bedding tray to resist movement of said bedding tray on said base platform.

In a further advantageous embodiment, said air duct extends around the entire perimeter of said base platform.

In a further advantageous embodiment, said air duct includes at least one internal airflow control wall to prevent air from recirculating through said air duct.

In a further advantageous embodiment, said at least one internal airflow control wall is disposed in said air duct to define at least two airflow pathways within said air duct.

In a further advantageous embodiment, said at least one air discharge port comprises a gap between a wall of said air duct and said base platform so that the air is discharged directly onto and across a top surface of said base platform and underneath said bedding tray.

In a further advantageous embodiment, at least one support arm is included extending from said wall of said air duct to said base platform for maintaining said gap between said wall and said base platform.

In a further advantageous embodiment, said gap defines at least one elongated opening.

In a further advantageous embodiment, said base platform is sloped from said air duct to an air circulation port centrally positioned in said base platform to facilitate funneling debris toward said air circulation port.

In a further advantageous embodiment, said bedding tray includes a mesh bedding surface to allow air to be drawn downward through said bedding tray by said blower unit.

In a further advantageous embodiment, said bedding tray includes a bedding surface having a series of first airflow ports to allow air to be drawn downward through said bedding tray by said blower unit.

In a further advantageous embodiment, a bedding surface topper is included having a series of second airflow ports complementary to said first airflow ports in said bedding surface to allow air to be drawn downward through said bedding surface topper and said bedding tray by said blower unit.

In a further advantageous embodiment, said base platform includes a static electricity reduction material disposed on a top surface to facility movement of debris across said base platform.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, figures and all reasonable inferences to be drawn therefrom.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
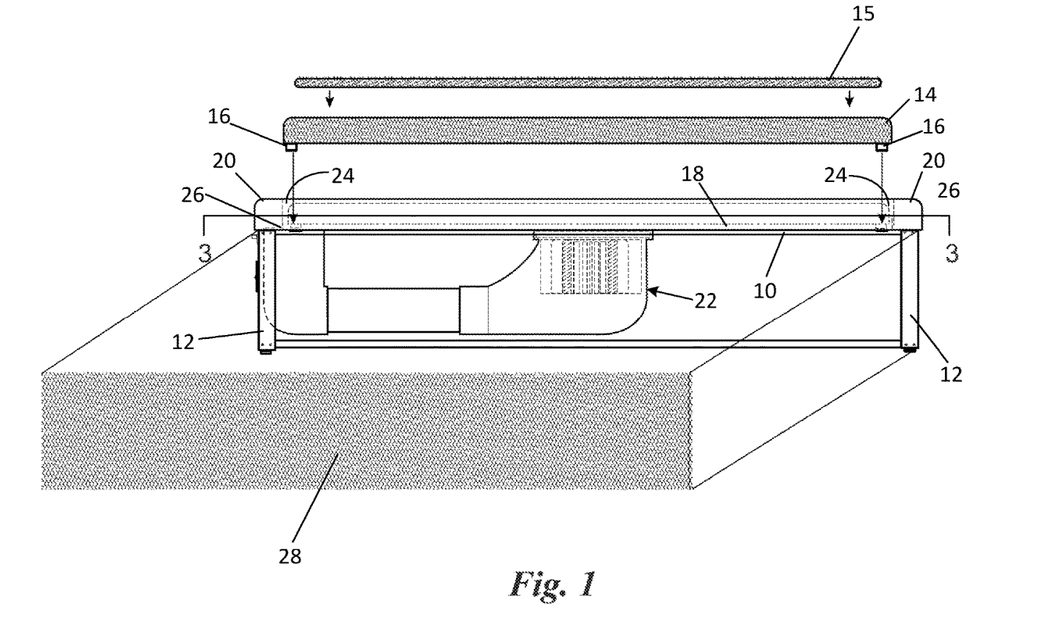
FIG. 1 shows an exploded side view of the pet bed platform according to the present invention.
Figure 2:
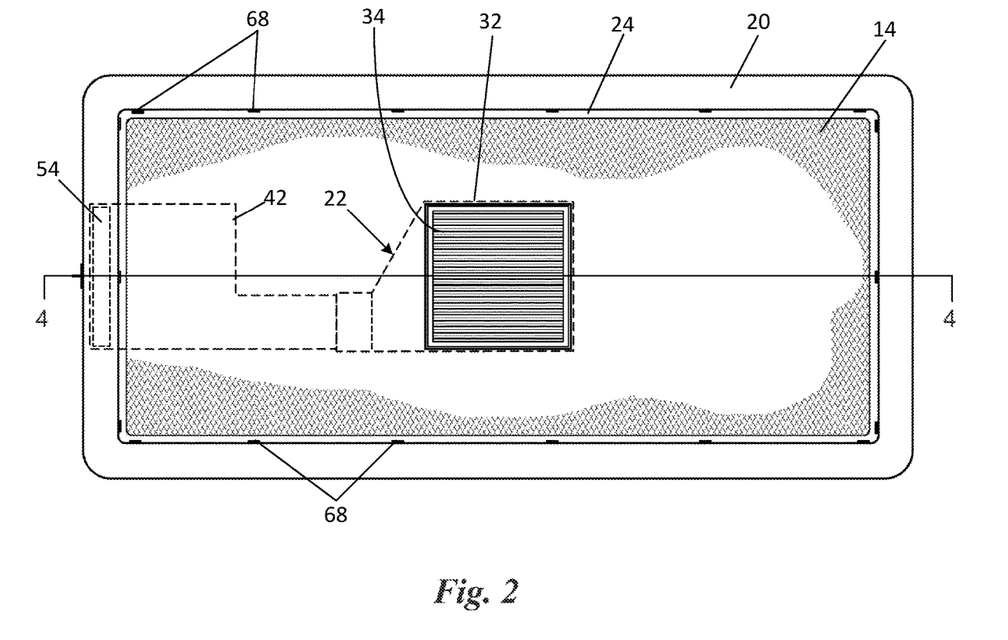
FIG. 2 shows a top view of the pet bed platform with a partial cut-away showing a filter underneath a bedding tray according to the present invention.

Referring to FIGS. 1 and 2, an exploded view of an embodiment of a pet bed platform according to the present invention is shown. In the illustrated embodiment, the pet bed platform includes a base platform 10 having a plurality of platform legs 12 mounted to base platform 10 for raising the base platform to a desired height. The platform legs are preferably adjustable to allow for varying the step-in height to accommodate pets of various sizes.

A bedding tray 14 is carried by base platform 10 onto which a pet can rest. A plurality of tray legs 16 are mounted to bedding tray 14 for raising the bedding tray above base platform 10 to define an air channel 18 (see also FIGS. 7 and 8) between base platform 10 and bedding tray 14. Preferably, bedding tray 14 is between about 0.5" to 2.0" above base platform 10 to define air channel 18. Bedding tray 14 may have a solid surface with no slits or opening for airflow to maximize the flow of air into an air suction gap 24 surrounding the bedding tray to draw pet hair and debris through the air suction gap 24 and onto base platform 10 where the airflow can carry the debris to an air filter 34 for capture. A bedding surface topper 15 can be placed on bedding tray 14 as desired to vary the comfort of the bedding tray for the pet.

Figure 3:
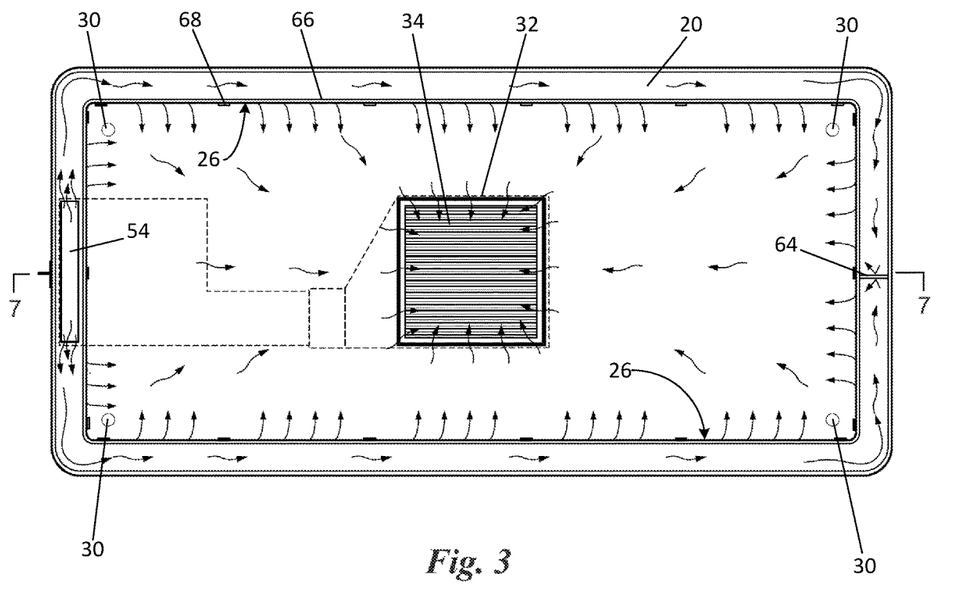
FIG. 3 shows a top view and airflow pattern of the pet bed platform with the bedding tray removed according to the present invention.

With further reference to FIG. 3, an air duct 20 is disposed on a perimeter of base platform 10 and receives air from a blower unit, designated generally as 22, carried by base platform 10. Further, air suction gap 24 is disposed between air duct 20 and bedding tray 14. In the illustrated embodiment, air suction gap 24 surrounds bedding tray 14 to draw air downward around all sides of bedding tray 14 to help contain hair, dander and debris from the pet. Additionally, at least one air discharge port 26 is disposed in air duct 20 directing air into air channel 18 underneath bedding tray 14, which draws air downward through air suction gap 24 around bedding tray 14 to help contain pet hair, dander and debris in the pet bed platform where the air is then filtered and recirculated to capture and contain debris.

In the illustrated embodiment, a skirt 28 is provided around the perimeter on a bottom portion of the pet bed platform to enclose the components underneath the base platform. In one embodiment, skirt 28 is a mess material that allows for some airflow underneath base platform 10. In a further embodiment, skirt 28 may be a solid surface material, for example wood, plastic or metal sheets, depending on aesthetic choices.

Figure 8:
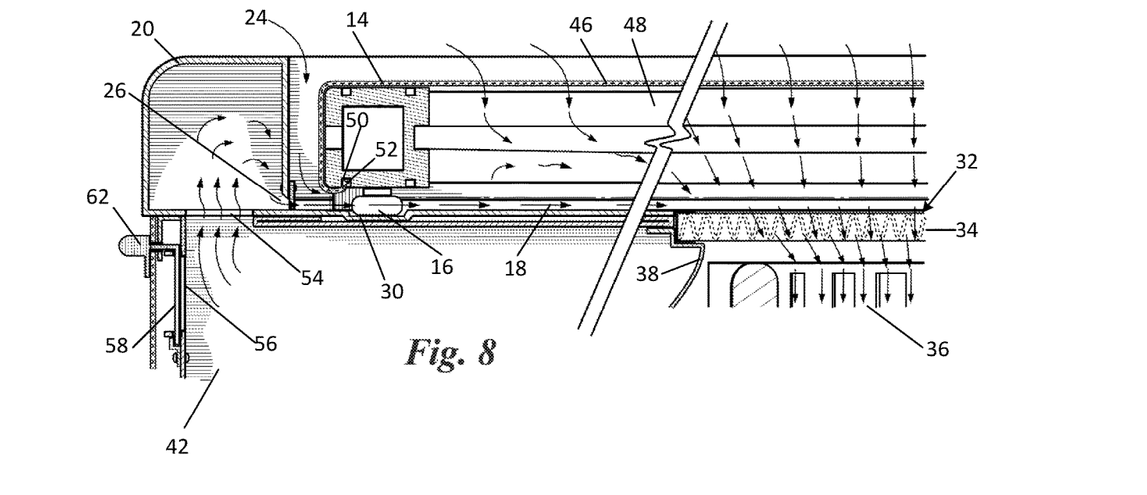
FIG. 8 shows a detailed cross-section view and airflow pattern of a portion of the pet bed platform according to the present invention.

As best shown in FIGS. 3 and 8, base platform 10 preferably includes a plurality of leg slots 30 for receiving tray legs 16 from bedding tray 14 to resist movement of the bedding tray on base platform 10 to help maintain a consistent air suction gap 24 between bedding tray 14 and air duct 20. Preferably, air suction gap is between about ¼" to about 1". In the illustrated embodiment, the air suction gap is about ¾". Further, a bottom surface of tray legs 16 include a non-skid material such as a rubber, felt or other coating to resist sliding on base platform 10.

Figure 7:
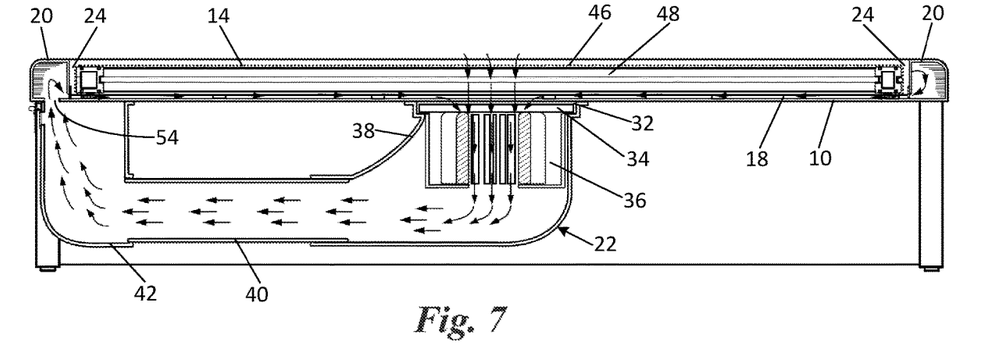
FIG. 7 shows cross-section view and airflow pattern of the pet bed platform according to the present invention.

Referring to FIGS. 3, 7 and 8, in the illustrated embodiment, blower unit 22 is mounted to a bottom side of base platform 10 drawing air downward through an air circulation port 32 in base platform 10. An air filter 34 is disposed in air circulation port 32 of said base platform filtering air drawn into blower unit 22. In the illustrated embodiment, air filter 34 is seated in air circulation port 32 so that air filter 34 is flush with the top surface of base platform 10 so that debris can easily enter air filter 34 for capture. Accordingly, air filter 34 is positioned between blower unit 22 and the underside of bedding tray 14 for filtering air being drawn through air circulation port 32.

Air filter 34 may comprise a broad range of filter types constructed and arranged to capture large and small particulates, carbon for smells, and even MERV and HEPA, as desired or needed. Air filter 34 may also comprise an arrangement of multiple stacked filters, each of which could be the same or intended to filter a given target. For example, a first filter may be utilized to capture large debris, such as hair, while a second filter is utilized to capture dander and filter smells.

Figure 6:
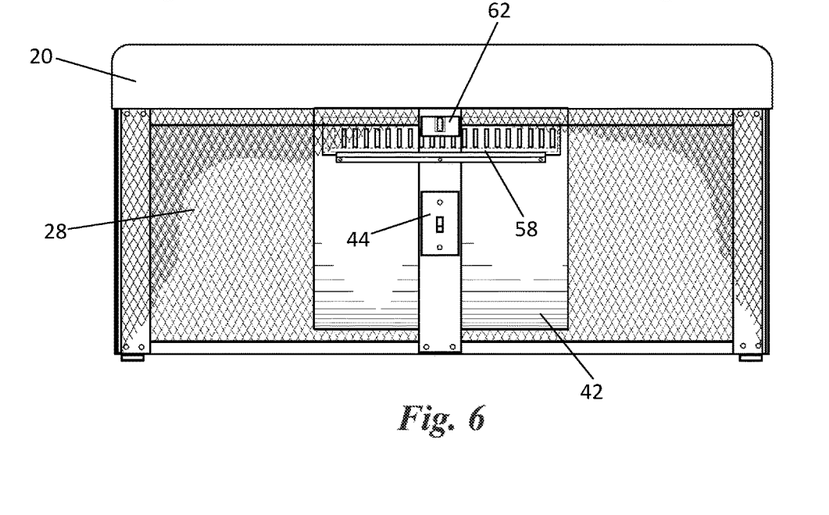
FIG. 6 shows an end view with a partial cut-away of pet bed platform according to the present invention.

Referring to FIG. 7, blower unit 22 further includes an electric powered fan 36 in a fan housing 38. In the illustrated embodiment, fan housing 38 is mounted to a bottom side of base platform 10 around air circulation port 32 and carries air filter 34. Fan housing 38 further includes an extension conduit 40 for channeling the air from fan housing 38 into a distribution plenum 42. In the illustrated embodiment, a power switch 44 (FIG. 6) is positioned in skirt 28 for controlling operation of blower unit 22.

In one embodiment fan 36 comprises a centrifugal fan design, or alternatively, a backward curved blade design. Depending on the size of pet bed platform to be filtered, the CFM should change. Most animal housing for pets would be in a range of 80 to 250 CFM, though larger pet bed platforms may require use of a 220 to 2000 CFM fan design. The noise level is preferably between about 20 to 60 db to be pleasant for the animal. In the illustrated embodiment, fan 36 is a centrifugal fan with 165 CFM rating. The fan size is 4" deep and 9" diameter, this can be smaller or larger depending on RPM of the fan and how quiet it operates.

The pet will want to lay, sleep, on bedding tray 14 as it has a constant cooling airflow when in operation. This increases the chance hair/dander is immediately pulled into air filter 34. Blower unit 22 has a low decibel ("db") operation so that the pet bed platform is a peaceful space for the pet to rest and sleep. Preferably the db level is around 20 db, but depending on the size of the pet bed platform and the fan, could be as low as around 60 db. In the illustrated embodiment, fan 36 operates around 36 db. Low fan noise is particularly important if the pet bed platform is to be used for cats.

Referring to FIGS. 7 and 8, in one embodiment, bedding tray 14 includes a mesh bedding surface to allow air to be drawn downward through bedding tray 14 by blower unit 22. The mesh on bedding tray 14 in one embodiment comprises a woven fabric mesh using 0.018" diameter vinyl coated 500 denier polyester core yarns in the warp and in the fill. This material is sufficiently durable to resist the weight, scratching, and biting of the largest dogs. In the illustrated embodiment, a mesh sheet 46 is carried by frame 48 and suspended above base platform 10 to define an animal receiving surface on which the pet can rest. Mesh sheet 46 allows for vertical airflow, primarily in a downward direction, through bedding tray 14 and into air circulation port 32. Compared to conventional pillow type bedding, the mesh sheet 46 provides an animal receiving surface that is easy to clean. Debris can simply be wiped or sprayed off the mesh. To attach mesh sheet 46 to frame 48, securing channels 50 are disposed in frame 48. A spline 52 wedges mesh sheet 46 into one or more of securing channels 50 for affixing mesh sheet 46 to frame 48. Small debris and dander can also pass through mesh sheet 46 onto base platform 10 below to be pushed by the airflow into air filter 34 where the debris captured.

Referring to FIG. 1, bedding surface topper 15 may be disposed on top of mesh sheet 46 of bedding tray 14. Bedding surface topper 15 can be solid to block airflow through mesh sheet 46 of bedding tray 14, which increases suction through air suction gap 24. Some pets may also prefer not to have airflow through bedding tray 14. Alternatively, bedding surface topper 15 can include a plurality of slits 17 (FIG. 15) for allowing vertical airflow through bedding surface topper 15 and mesh sheet 46. In this arrangement, dander and other debris can also pass through the slits and be collected on mesh sheet 46. Small debris such as dander and fine dirt can even pass through mesh sheet 46 onto base platform 10 and may be collected into air filter 34. Bedding surface topper 15 may be made of a durable foam or rubber material, or other suitable material for an animal bedding surface as desired.

Figure 4:
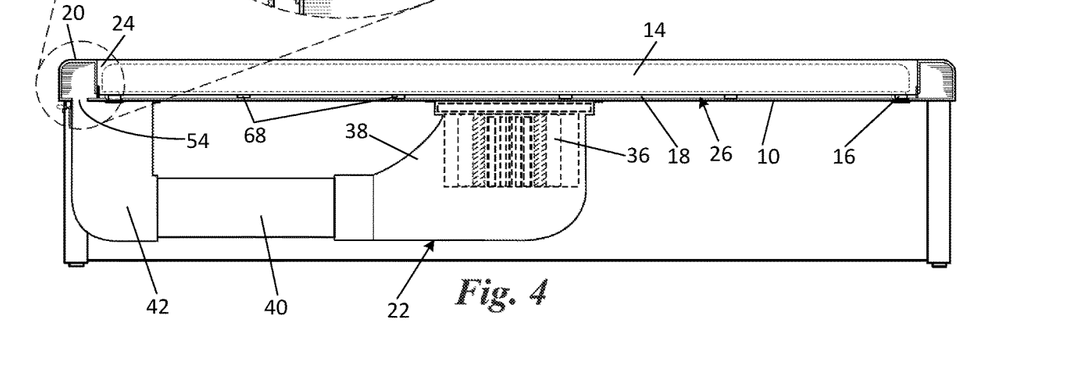
FIG. 4 shows a cross-section view of the pet bed platform according to the present invention.
Figure 4A:
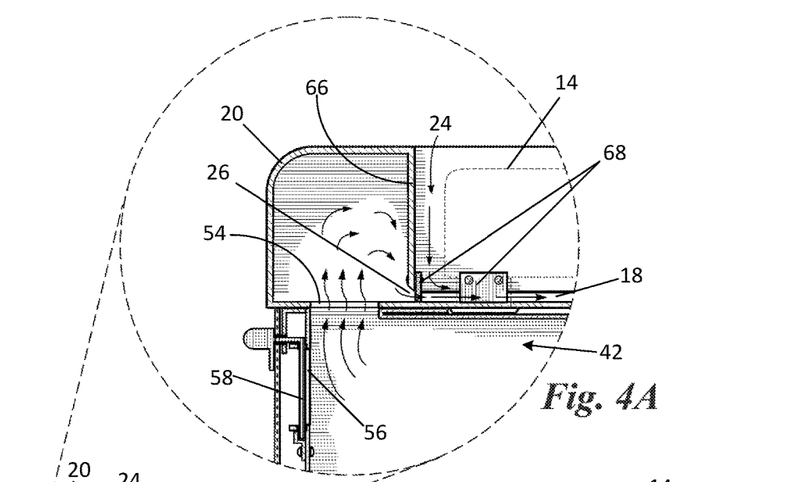
FIG. 4a shows a detailed cross-section view of a portion of the pet bed platform according to the present invention.

Referring to FIGS. 4 and 4A, in the illustrated embodiment, distribution plenum 42 receives air from blower unit 22 to build up air pressure and channels the air into air duct 20. In one embodiment, distribution plenum 42 is carried on a bottom side of base platform 10 and includes an exhaust port 54 opening directly into air duct 20 for channeling air from distribution plenum 42 into air duct 20.

Figure 5A:
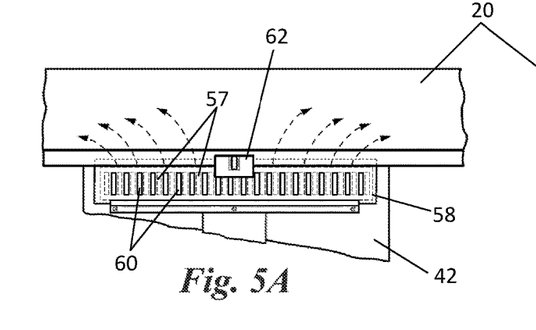
FIGS. 5A and 5B show a vent in the distribution plenum of the pet bed platform according to the present invention.
Figure 5B:
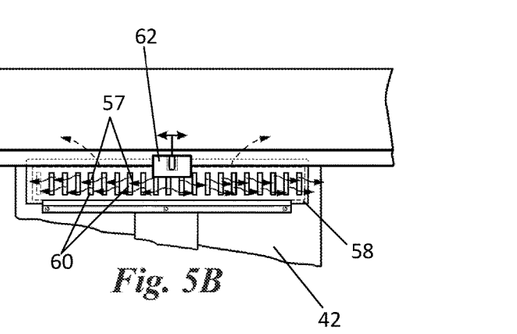

Referring to FIGS. 4A, 5A, 5B, and 6 a vent 56 is included for releasing air from distribution plenum 42 into a surrounding area. In the illustrated embodiment, skirt 28 is a mesh material that allow air to pass through from vent 56. If a solid sheet material is used, vent 56 should be positioned to allow air to pass through and into the surrounding area. In one embodiment, vent 56 is defined by a series of slots 57 in the wall of distribution plenum 42. A vent cover 58 is operatively associated with vent 56 to selectively control the amount of airflow through vent 56 to adjust the air pressure within distribution plenum 42 and ultimately air duct 20. In the illustrated embodiment, vent cover 58 includes a series of vent slots 60 and is slidably carried on distribution plenum 42. A handle 62 is provided for lateral shifting vent cover 58 to selectively align and misalign vent slots 60 with slots 57 of vent 56 to control the amount of airflow through said vent. In FIG. 5A, vent 56 is closed and all air is directed into air duct 20. In FIG. 5B, vent 56 is open and air is allowed to exit distribution plenum 42, which lowers the air pressure and air flow through air duct 20. By selectively positioning vent cover 58, the amount of air exhausted from air duct 20 back toward air circulation port 32 can be adjusted.

Referring to FIG. 3, in the illustrated embodiment, air duct 20 extends around the entire perimeter of base platform 10. Air from distribution plenum 42 is then directed into air duct 20 and channeled around the perimeter of base platform 10 where it is then exhausted through at least one air discharge port 26, which directs the air into an air channel 18 defined between the top surface of base platform 10 and the bottom side of bedding tray 14. In one embodiment, air duct 20 includes at least one internal airflow control wall 64 to prevent air from recirculating through air duct 20 and forcing the air out through at least one air discharge port 26. In the illustrated embodiment, at least one internal airflow control wall 64 is disposed in air duct 20 at the opposite end of base platform 10 from exhaust port 54 of distribution plenum 42 to define two airflow pathways within air duct 20. As air enters, it is directed along the perimeter air duct 20 in two directions for more uniform air pressure within air duct 20.

Figure 9:
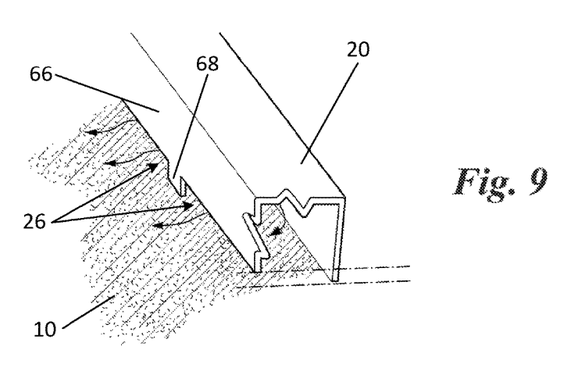
FIG. 9 shows a perspective view of a portion of the air duct and airflow pattern of the pet bed platform according to the present invention.

Referring to FIGS. 3, 4A, and 9, in one embodiment, at least one air discharge port 26 comprises a gap between a wall 66 of air duct 20 and base platform 10 so that the air is discharged directly onto and across a top surface of base platform 10 and underneath bedding tray 14. At least one support arm 68 is included extending from 66 wall of air duct 20 to base platform 10 for maintain the gap between wall 66 and a top surface of base platform 10. In one embodiment the gap is between about 1/8" to 1/16". Preferably, at least one air discharge port 26 defines at least one elongated opening. As the air exits air duct 20 through the gap, air is drawn downward through air suction gap 24 around bedding tray 14 which helps to contain pet hair, dander and debris in the pet bed platform where the air is then filtered and recirculated to capture and contain debris. In an alternative embodiment, the at least one air discharge port comprises a plurality of apertures spaced along air duct 20 adjacent base platform 20 for directed air underneath bedding tray 14. Preferably, any air discharge port in the corners of air duct 20, if the pet bed platform is rectangular in shape, channel air directly back toward air circulation port 32 to prevent cross flow between adjacent sides at the corners of air duct 20. Optionally, the corners of air duct 20 may not include any air discharge port.

Figure 10:
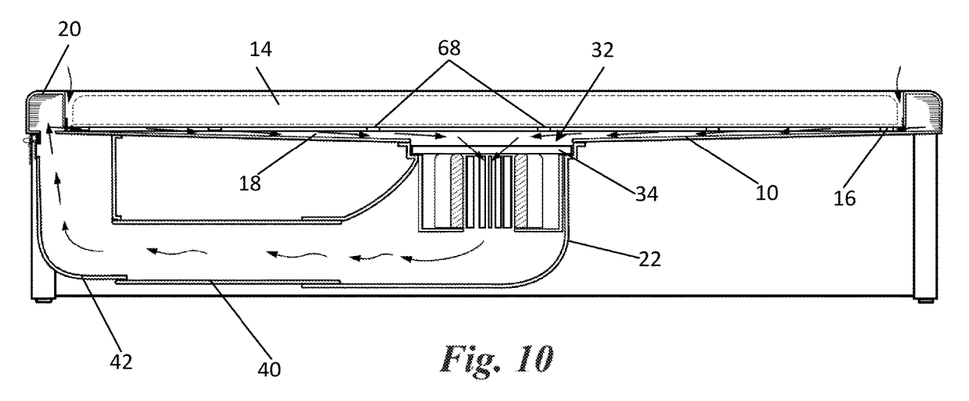
FIG. 10 shows a cross-section view and airflow pattern of the pet bed platform with a sloped base platform according to the present invention.
Figure 11:
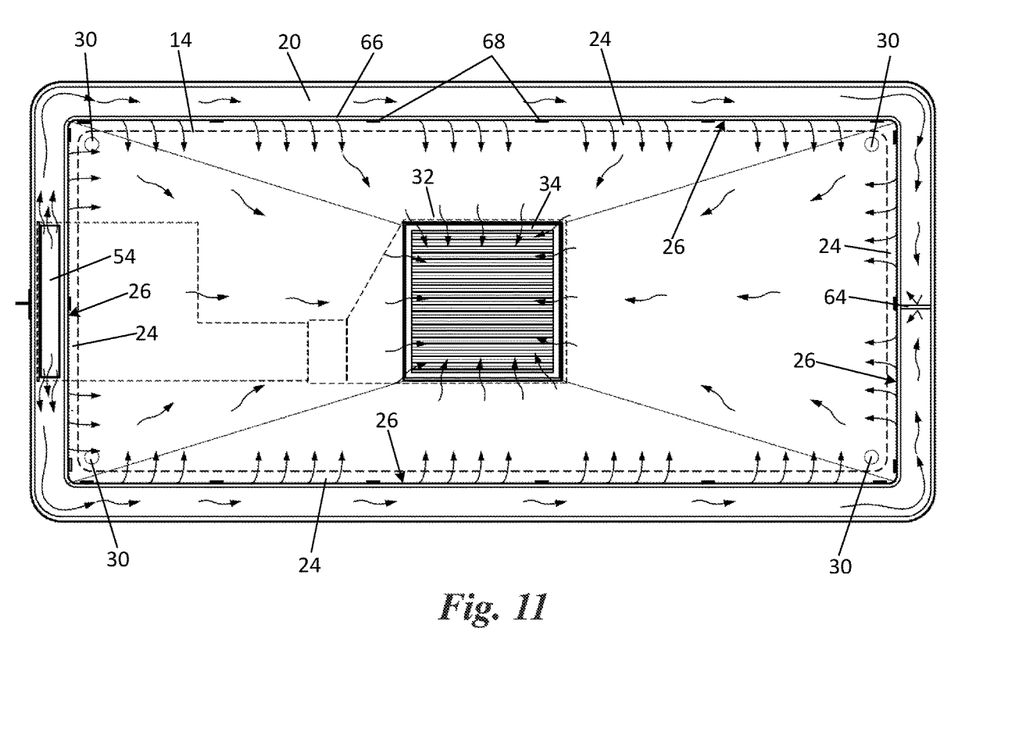
FIG. 11 shows a top view and airflow pattern of the pet bed platform with a sloped base platform according to the present invention; and, FIG. 12 shows an exploded perspective view of the pet bed platform with a sloped base platform according to the present invention.
Figure 12:
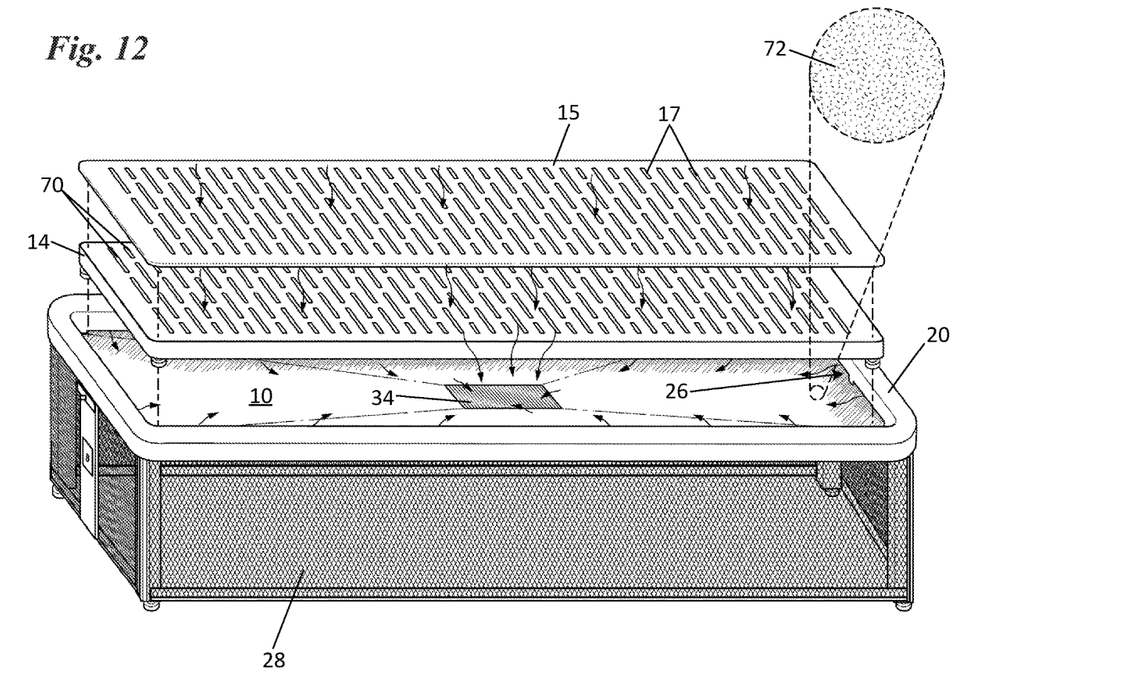

Referring to FIGS. 10, 11 and 12, in one embodiment, base platform 10 is sloped from air duct 20 to air circulation port 32 centrally positioned in base platform 10 to facilitate funneling debris toward air circulation port 32 to be captured in air filter 34.

Referring to FIG. 12, in one embodiment, bedding tray 14 includes a bedding surface having a series of first airflow ports 70 to allow air and debris to be drawn downward through the bedding tray by blower unit 22. In this arrangement, it is preferred that a bedding surface topper 15 also include a series of second airflow ports 17 complementary to said first airflow ports 70 in the bedding surface of bedding tray 14 to allow air to be drawn downward through bedding surface topper 15 and bedding tray 14 by blower unit 22. By using a solid bedding surface topper 15 as in FIG. 1, or a bedding surface topper with fewer slits than in the underlying bedding tray 14, airflow through bedding tray 14 is reduced but suction around the edges into air suction gap 24 is increased. For larger pet bed platforms, bedding tray 14 preferably has a solid surface with no slits or opening for airflow to maximize the flow of air into the air suction gap 24 surrounding the bedding tray to draw pet hair and debris through the air suction gap 24 and onto base platform 10 where the airflow can carry the debris to air filter 34 for capture.

In one embodiment, base platform 10 preferably includes a static electricity reduction material 72, such as a paint, disposed on a top surface to facility movement of debris across base platform 10.

Dog hair is the primary collection problem with dogs. Dander is light weight and easily brought into the air filter with the negative air pressure and airflow direction of the present invention. The pet bed platform of the present invention stops pet hair from traveling through the house, building, vehicle, plane, boat, camper, etc. The airflow around, under and through bedding tray 14 help limit the hair, fur, and dander and other debris from leaving the space. The downward direction of the airflow through and around bedding tray 14 also helps cool the pet resting on the bedding tray surface while helping to capture the dirt, hair, dander etc. directly in the air filter.

This filter system not only filters the air directly from the pet but will filter the air in the entire room. This is useful because it pulls the air directly from the pet and the surround area and does not allow this dander/hair to travel throughout the house to other surfaces since it is processed immediately at the source. In addition to debris from the pet, the air in the room is filtered for smells and other pollutants depending on the filter.

The pet bed platform of the present invention will gather most of the hair and dander. Some pets have fine hair which is easily drawn into the air filter. Some pets have heavier hair that will fall through air suction gap 24 onto base platform 10 below where it is likely to be drawn into the air filter. Even if the heavier hair is not drawn into the air filter, virtually all the hair and dander stays within the pet bed platform. Since the airflow is directed downward through the bed and from the sides to the center where the air filter is carried, most of the hair-dander goes in the air filter 38 and is trapped. The rest is contained within the perimeter of air duct 20 on base platform 10.

The system of the present invention prevents daily vacuuming around areas in which the pet sleeps. The bedding tray 14 can be easily removed and cleaned as needed, as well as base platform 10. The air filter can be cleaned or replaced as needed.

The invention thus cleans the pet hair and dander at its source and provides a comfortable space that encourages resting. The bedding tray 14 having suspended mesh sheet can also help clean pet's feet after a walk or being outside and help dry the pet after washing.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A pet bed platform comprising:
    a base platform;
    a plurality of platform legs mounted to said base platform for raising said base platform;
    a bedding tray carried by said base platform;
    a plurality of tray legs mounted to said bedding tray raising said bedding tray above said base platform to define an air channel between a top side of said base platform and a bottom side of said bedding tray;
    a blower unit carried by said base platform;
    an air duct disposed on a perimeter of said base platform receiving air from said blower unit, wherein said air duct extends around an entire perimeter of said base platform and encircles said bedding tray;
    an air suction gap defined between said air duct and a perimeter side surface of said bedding tray, wherein said air suction gap extends around an entire perimeter of said bedding tray; and,
    at least one air discharge port defined by at least one elongated opening disposed adjacent said base platform and extending throughout said air duct directing air into said air channel, wherein said air channel provides unrestricted airflow without any vertical walls dispose in said air channel underneath said bedding tray from around all sides of said bedding tray and, wherein said at least one elongated opening directing air into said air channel draws air downward through said air suction gap from around said entire perimeter of said bedding tray and into said air channel underneath said bedding tray so that debris is drawn down around the sides of said bedding tray and directed across said base platform to an air circulation port disposed in a central location of said base platform.

2. The pet bed platform of claim 1 wherein said blower unit is mounted to a bottom side of said base platform drawing air downward through said air circulation port in said base platform.

3. The pet bed platform of claim 2 including an air filter disposed in said air circulation port of said base platform filtering air drawn into said blower unit.

4. The pet bed platform of claim 1 including a distribution plenum receiving air from said blower unit and channeling the air into said air duct.

5. The pet bed platform of claim 4 wherein said distribution plenum is carried on a bottom side of said base platform and includes an exhaust port opening directly into said air duct for channeling air from said distribution plenum into said air duct.

6. The pet bed platform of claim 5 including a vent for releasing air from said distribution plenum into a surrounding area; and a vent cover operatively associated with said vent to selectively control the amount of airflow through said vent to adjust the air pressure within said distribution plenum.

7. The pet bed platform of claim 1 wherein said base platform includes a plurality of leg slots for receiving said tray legs from said bedding tray to resist movement of said bedding tray on said base platform.

8. The pet bed platform of claim 1 wherein said air duct includes at least one internal airflow control wall to prevent air from recirculating through said air duct.

9. The pet bed platform of claim 8 wherein said at least one internal airflow control wall is disposed in said air duct to define at least two airflow pathways within said air duct.

10. The pet bed platform of claim 1 wherein said slot of said air discharge port comprises a gap between a wall of said air duct and said base platform so that the air is discharged directly onto and across a top surface of said base platform and underneath said bedding tray.

11. The pet bed platform of claim 10 including at least one support arm extending from said wall of said air duct to said base platform for maintaining said gap between said wall and said base platform.

12. The pet bed platform of claim 10 wherein said gap defines at least one elongated opening.

13. The pet bed platform of claim 1 wherein said base platform is sloped from said air duct to an air circulation port centrally positioned in said base platform to facilitate funneling debris toward said air circulation port.

14. The pet bed platform of claim 1 wherein said bedding tray includes a mesh bedding surface to allow air to be drawn downward through said bedding tray by said blower unit.

15. The pet bed platform of claim 1 wherein said bedding tray includes a bedding surface having a series of first airflow ports to allow air to be drawn downward through said bedding tray by said blower unit.

16. The pet bed platform of claim 15 including a bedding surface topper having a series of second airflow ports complementary to said first airflow ports in said bedding surface to allow air to be drawn downward through said bedding surface topper and said bedding tray by said blower unit.

17. The pet bed platform of claim 1 wherein said base platform includes a static electricity reduction material disposed on a top surface to facilitate movement of debris across said base platform.

18. A pet bed platform comprising:
    a base platform;
    a bedding tray carried on said base platform with an air channel disposed between a top side of said base platform and a bottom side of said bedding tray;
    an air duct disposed on a perimeter of said base platform receiving air from a blower unit, wherein said air duct extends around an entire perimeter of said base platform and encircles said bedding tray;
    an air suction gap defined between said air duct and a perimeter side surface of said bedding tray, wherein said air suction gap extends around an entire perimeter of said bedding tray; and,
    at least one air discharge port defined by at least one elongated opening disposed adjacent said base platform and extending throughout said air duct directing air into said air channel, wherein said air channel provides unrestricted airflow without any vertical walls dispose in said air channel underneath said bedding tray from around all sides of said bedding tray and, wherein said at least one elongated opening directing air into said air channel draws air downward through said air suction gap from around said entire perimeter of said bedding tray and into said air channel underneath said bedding tray so that debris is drawn down around the sides of said bedding tray and directed across said base platform to an air circulation port disposed in a central location of said base platform.

* * * * *